US012177564B2

(12) United States Patent
Kobayashi

(10) Patent No.: US 12,177,564 B2
(45) Date of Patent: Dec. 24, 2024

(54) IMAGING APPARATUS, CONTROL METHOD FOR IMAGING APPARATUS, AND STORAGE MEDIUM FOR DETERMINING AN IN-FOCUS POSITION OF A FOCUS LENS

(71) Applicant: CANON KABUSHIKI KAISHA, Tokyo (JP)

(72) Inventor: Shigeyuki Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 247 days.

(21) Appl. No.: 17/834,780

(22) Filed: Jun. 7, 2022

(65) Prior Publication Data

US 2022/0400198 A1 Dec. 15, 2022

(30) Foreign Application Priority Data

Jun. 10, 2021 (JP) ................................ 2021-097303

(51) Int. Cl.

| | |
|---|---|
| ***H04N 23/67*** | (2023.01) |
| ***G06T 7/20*** | (2017.01) |
| ***G06T 7/73*** | (2017.01) |
| ***H04N 23/63*** | (2023.01) |

(52) U.S. Cl.

CPC ............... *H04N 23/67* (2023.01); *G06T 7/20* (2013.01); *G06T 7/73* (2017.01); *H04N 23/633* (2023.01); *G06T 2207/30232* (2013.01)

(58) Field of Classification Search

None

See application file for complete search history.

(56) References Cited

U.S. PATENT DOCUMENTS

| | | | | |
|---|---|---|---|---|
| 2010/0289940 | A1* | 11/2010 | Toguchi | H04N 23/673 348/E5.045 |
| 2019/0238757 | A1* | 8/2019 | Sugaya | H04N 23/72 |
| 2021/0120186 | A1* | 4/2021 | Mitani | G02B 7/09 |
| 2023/0171492 | A1* | 6/2023 | Scheper | H04N 23/80 348/353 |

FOREIGN PATENT DOCUMENTS

| | | |
|---|---|---|
| JP | 2019134271 A | 8/2019 |

* cited by examiner

*Primary Examiner* — Quan Pham

(74) *Attorney, Agent, or Firm* — Canon U.S.A., Inc. IP Division

(57) ABSTRACT

An apparatus includes a control unit configured to control a position of a focus lens of the apparatus, an acquisition unit configured to acquire an event signal indicating a position of a pixel in which a luminance change has occurred and a time when the luminance change has occurred, and a determination unit configured to determine an in-focus position of the focus lens by acquiring, for each position of the focus lens, an evaluation value based on the event signal.

17 Claims, 12 Drawing Sheets

START
S601 SET AF EVALUATION FRAME
S602 MOVE FOCUS LENS
S603 NUMBER OF PIXELS HAVING LUMINANCE CHANGE IN AF EVALUATION FRAME < THRESHOLD $TH_{AF}$? (NO / YES)
S604 START MEASURING TIME OR PULSES
S605 NUMBER OF PIXELS HAVING LUMINANCE CHANGE IN AF EVALUATION FRAME ≥ THRESHOLD $TH_{AF}$? (NO / YES)
S606 STOP MEASURING
S607 MOVE FOCUS LENS BY PREDETERMINED DISTANCE
END 100
304
OUTPUT UNIT
305
OPERATION ACCEPTANCE UNIT
302
EVALUATION UNIT
303
CONTROL UNIT
301 IMAGING UNIT
1011
PHOTOELECTRIC CONVERSION ELEMENT
1010
IMAGING OPTICAL SYSTEM
1012
FOCUS CONTROL MECHANISM

IMAGE FORMED ON SENSOR IMAGE SURFACE
IMAGE CAPTURED BY EVENT-BASED SENSOR
FOCUS LENS
NEAR SIDE
POSITION A
AF EVALUATION FRAME
POSITION B
POSITION C
POSITION D
POSITION E
IN-FOCUS RANGE
POSITION F
FAR SIDE

IMAGE FORMED ON SENSOR IMAGE SURFACE
IMAGE CAPTURED BY EVENT-BASED SENSOR
NEAR SIDE
POSITION A
POSITION B
POSITION C
POSITION D
POSITION E
FAR SIDE
IN-FOCUS RANGE

IMAGING APPARATUS, CONTROL METHOD FOR IMAGING APPARATUS, AND STORAGE MEDIUM FOR DETERMINING AN IN-FOCUS POSITION OF A FOCUS LENS

BACKGROUND

Technical Field

The disclosure relates to autofocus of an event-based sensor.

Description of the Related Art

There is known an event-based sensor that outputs a luminance change of each pixel as an address event signal in real time, as discussed in Japanese Patent Application Laid-Open No. 2019-134271.

SUMMARY

The aspect of the embodiments is directed to enabling autofocus in an imaging apparatus using an event-based sensor.

According to an aspect of the embodiments, an apparatus includes a control unit configured to control a position of a focus lens of the apparatus, an acquisition unit configured to acquire an event signal indicating a position of a pixel in which a luminance change has occurred and a time when the luminance change has occurred; and, a determination unit configured to determine an in-focus position of the focus lens by acquiring, for each position of the focus lens, an evaluation value based on the event signal.

Further features of the disclosure will become apparent from the following description of exemplary embodiments with reference to the attached drawings.

DESCRIPTION OF THE EMBODIMENTS

Figure 1:
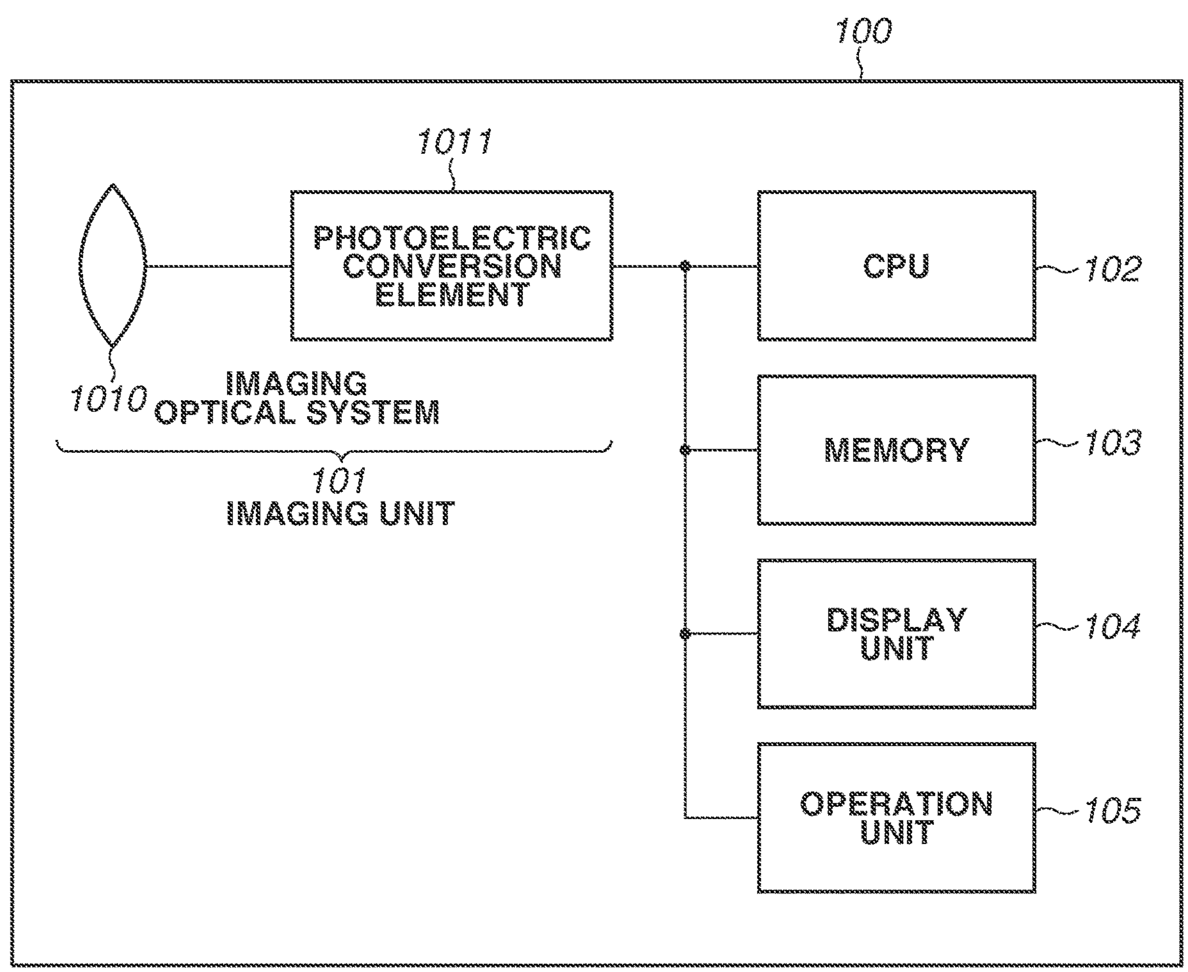
FIG. 1 is a block diagram illustrating an example of a hardware configuration of an imaging apparatus.

An event-based sensor is expected to be applied to a security camera.

A security camera sometimes performs imaging in a low illuminance environment for surveillance at night or other purposes. In such a case, the imaging is often performed by reducing an aperture value to increase the amount of light to be received by a sensor. Setting a small aperture value reduces a depth of field, and thus focusing on a subject is often required. For this reason, an autofocus (AF) function is applied for enabling a user to easily perform the focusing.

Contrast AF is known as an autofocus technique, but it is difficult to apply the contrast AF to a camera using an event-based sensor for the following reason. In the contrast AF, an in-focus position is determined based on a contrast evaluation value indicating the level of contrast in a specific region (hereinafter referred to as an AF evaluation frame) in an image. In other words, a position of when the contrast evaluation value reaches a peak is determined to be the in-focus position. Typical methods for calculating the contrast evaluation value include a method using a ratio between a maximum luminance and a minimum luminance within the AF evaluation frame, and a method using a difference between the maximum luminance and the minimum luminance.

However, in the event-based sensor, three values (e.g., +1 representing a positive luminance change, −1 representing a negative luminance change, and 0 representing no luminance change) are used as values representing a luminance change of a pixel. In the event-based sensor, both positive and negative luminance changes occur in many cases except for a case where light incident on the sensor uniformly changes, such as a change in illumination brightness or diaphragm aperture diameter. For this reason, even if a known formula for calculating the contrast evaluation value is applied, the same evaluation value is obtained regardless of whether focus is achieved, and thus the in-focus position cannot be determined. An issue to be addressed by an exemplary embodiment of the disclosure is therefore to enable autofocus in an imaging apparatus using an event-based sensor.

An imaging apparatus according to an exemplary embodiment of the disclosure will be described below with reference to the drawings. In the following description, components having the same functions are denoted by the same reference numerals in all the drawings, and the redundant description thereof will be omitted.

<Hardware Configuration of Imaging Apparatus: FIG. 1>

FIG. 1 is a schematic diagram illustrating an example of a hardware configuration of an imaging apparatus (an information processing apparatus) 100 according to a first exemplary embodiment of the disclosure.

The imaging apparatus 100 is, more specifically, an imaging apparatus including an event-based sensor, but a function of performing image processing and a function of performing analysis processing (motion detection) on an image may be included in separate apparatuses. The imaging apparatus 100 includes an imaging unit 101 including an imaging optical system 1010 and a photoelectric conversion element 1011, a central processing unit (CPU) 102, a memory 103, a display unit 104, and an operation unit 105. The photoelectric conversion element 1011 is the event-based sensor that outputs an address event signal corresponding to received incident light. The event-based sensor detects a luminance change of each pixel as an event. The address event signal indicates a position of a pixel in which a luminance change has occurred and a time when the luminance change has occurred. The imaging optical system 1010 is, more specifically, a light receiving lens that receives incident light and forms an image on the photoelectric conversion element 1011. The CPU 102 reads out and executes an operating system (OS) and other programs stored in the memory 103, controls each component connected to the CPU 102, and performs calculations, logical determinations, and the like for various types of processing. Information processing according to the present exemplary embodiment is included in the processing performed by the CPU 102.

The CPU 102 also controls focus driving and aperture driving of the imaging optical system 1010, driving of the photoelectric conversion element 1011, and the like. The memory 103 is, for example, a hard disk drive or an external storage device, and stores a program concerning the information processing according to the present exemplary embodiment and various types of data. The display unit 104 is, for example, a display device that displays a calculation result and the like of the information processing apparatus 100, based on an instruction from the CPU 102. The display device may be of any type such as a liquid crystal display device, a projector, or a light emitting diode (LED) indicator. The operation unit 105 is, for example, a touch panel, a keyboard, a mouse, or a robot controller, and is a user interface for accepting an instruction input by the user. The information processing apparatus 100 may have a mechanism other than the hardware configuration illustrated in FIG. 1.

Figure 2A:
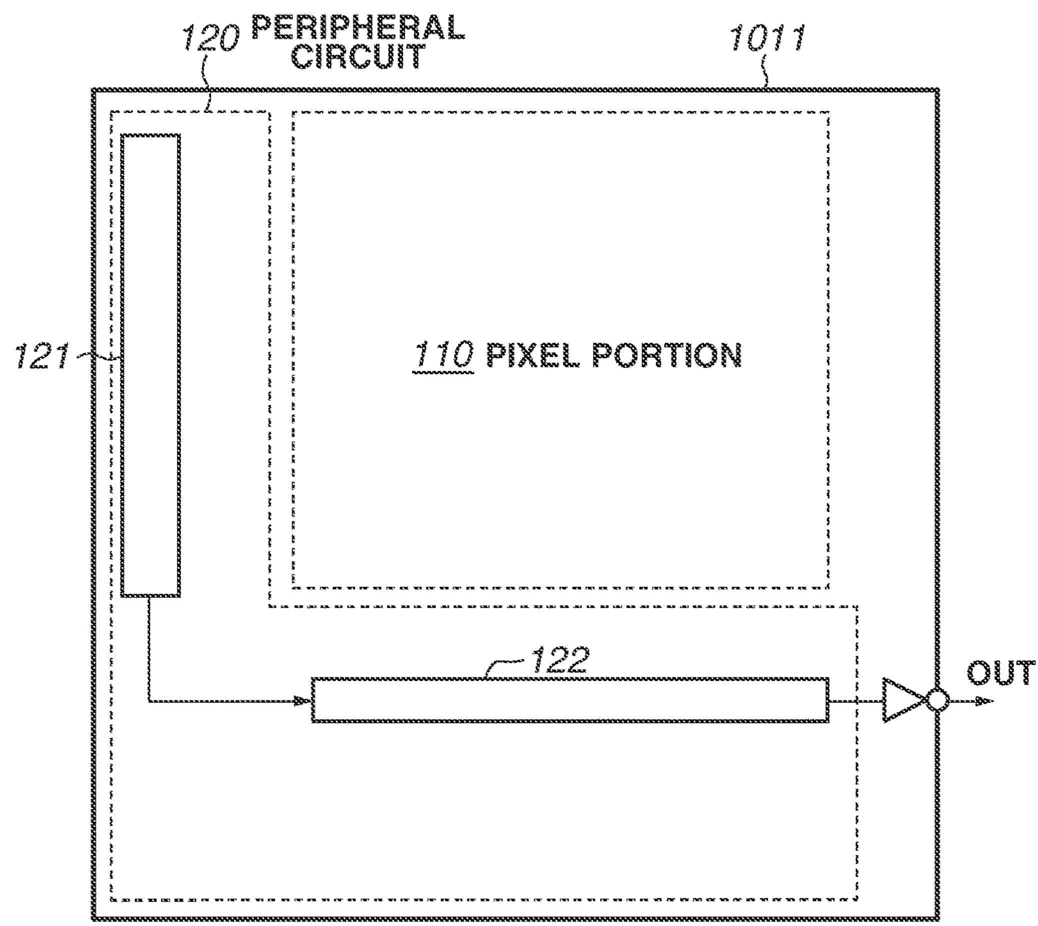
FIGS. 2A and 2B are diagrams illustrating an example of a configuration of an event-based sensor.
Figure 2B:
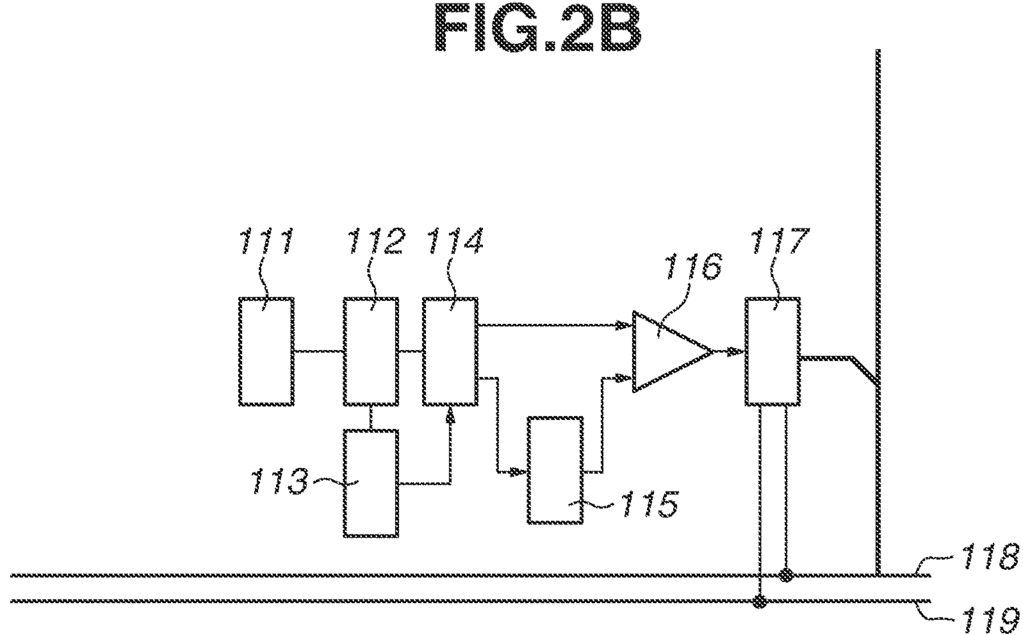

<Photoelectric Conversion Element: FIGS. 2A and 2B>

An example of the event-based sensor according to the present exemplary embodiment will be described. The event-based sensor counts the number of incident photons, and determines the timing when the number of counted photons exceeds a predetermined threshold. The event-based sensor also measures a time (a clock frequency) taken before the number of photons becomes a first threshold or more, and detects a luminance change by comparing the measured times. More specifically, assuming that the previously measured time is $T_0$ and the latest measured time is T, in a case where a difference $T-T_0$ is a second threshold or more, a luminance change in a minus direction is detected. In a case where a difference $T_0-T$ is the second threshold or more, a luminance change in a plus direction is detected. In a case where the difference between T and $T_0$ is less than the second threshold, no luminance change is detected. The second threshold is a value of 0 or more, and a preset value or a value set based on other parameters is used as the second threshold.

A detailed configuration thereof will be described. FIG. 2A illustrates an example of a configuration of the photoelectric conversion element 1011. The photoelectric conversion element 1011 includes a pixel portion 110 and a peripheral circuit 120. The peripheral circuit 120 includes a vertical arbitration circuit 121 and a horizontal output circuit 122.

FIG. 2B illustrates an example of a configuration of each pixel portion 110 included in the event-based sensor. The pixel portion 110 includes a photoelectric conversion portion 111, a pixel counter 112, a time counter 113, a first determination circuit 114, a memory 115, a comparator 116, a second determination circuit 117, a response circuit 118, and a selection circuit 119. The photoelectric conversion portion 111 includes an avalanche photodiode (a single-photon avalanche diode (SPAD)) that operates in a Geiger mode, and is configured to count the number of photons incident on the photoelectric conversion portion 111 by using the pixel counter 112. The time counter 113 counts the time during which photons are incident on the photoelectric conversion portion 111. Configuring the event-based sensor with the SPAD enables detection of a luminance change on a photon-by-photon basis. Detecting a luminance change on a photon-by-photon basis makes it possible to acquire the address event signal even in a night vision state such as nighttime.

When the number of photons counted by the pixel counter 112 reaches the first threshold, the first determination circuit 114 stops the counting of the time by the time counter 113. The past count value of the time counter 113 is stored in the memory 115, and a difference between the current count value of the time counter 113 and the past count value of the time counter 113 is determined using the comparator 116.

In a case where the difference between the count values is the second threshold or more, the second determination circuit 117 transmits a request signal to the vertical arbitration circuit 121 via the response circuit 118. The response circuit 118 receives a response indicating permission or non-permission of output of address event data, from the vertical arbitration circuit 121. In a case where the difference between the count values is less than the second threshold, the second determination circuit 117 does not transmit a request signal.

When the response circuit 118 receives a response indicating the permission of the output, the selection circuit 119 outputs the count value of the time counter 113 to the horizontal output circuit 122. The horizontal output circuit 122 outputs the received count value from the photoelectric conversion element 1011, as an output signal.

The difference between the count values calculated by the comparator 116 corresponds to the reciprocal of the incident frequency of photons, and thus the photoelectric conversion element 1011 according to the present exemplary embodiment has a function of measuring a "change in incident frequency of photons", i.e., a luminance change. Furthermore, using the second determination circuit 117, the address event is output in a case where the difference between the times taken before the number of incident photons reaches the first threshold is the second threshold or more. In other words, the photoelectric conversion element 1011 outputs the incident frequency in a case where the difference between the incident frequencies is the second threshold or more, and does not output the incident frequency in a case where the difference is less than the second threshold. The above-described configuration can implement an asynchronous-type photoelectric conversion element that detects the luminance change as the address event in real time, for each pixel address.

<Variation of Photoelectric Conversion Element>

The case of using the photoelectric conversion element 1011 that includes the SPAD in the photoelectric conversion portion 111 and detects a change in incident frequency of photons by measuring the time during which photons are incident has been described above. However, as long as the photoelectric conversion element 1011 detects the luminance change as the address event in real time, any configuration other than the configuration in FIGS. 2A and 2B may be used. For example, a photoelectric conversion element that detects a luminance change as a voltage change as discussed in Japanese Patent Application Laid-Open No. 2019-134271 may be used.

Figure 3:
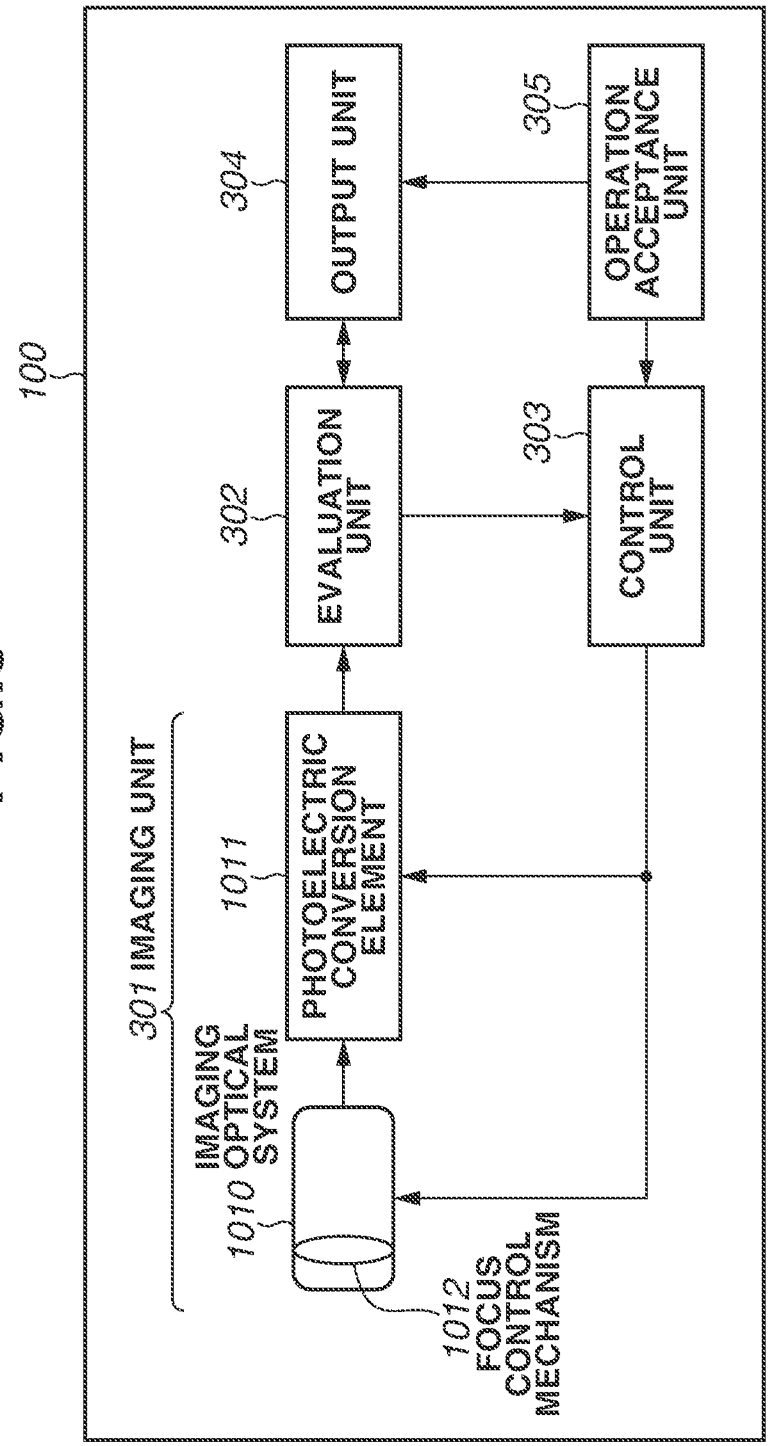
FIG. 3 is a block diagram illustrating an example of a functional configuration of the imaging apparatus.

<Imaging Apparatus: FIG. 3>

FIG. 3 illustrates an example of a functional configuration of the imaging apparatus (the information processing apparatus) 100 according to the present exemplary embodiment. An overview of the imaging apparatus 100 will be described first, and then functions thereof will be described in detail. Referring to FIG. 3, the imaging apparatus 100 includes an imaging unit 301, an evaluation unit 302, a control unit 303, an output unit 304, and an operation acceptance unit 305. The imaging unit 301 includes the imaging optical system 1010 including a focus control mechanism 1012 capable of changing a focusing position, and the photoelectric conversion element 1011 serving as the event-based sensor. The imaging unit 301 corresponds to the imaging unit 101 in FIG. 1. Components denoted by the same reference numerals as those in FIG. 1 will be described to have the same functions.

The imaging optical system 1010 is, more specifically, formed of a light receiving lens, and the focus control mechanism 1012 includes a focus lens and an actuator for driving the focus lens. In the present exemplary embodiment, the focus control mechanism 1012 includes a stepping motor capable of controlling the position of the focus lens by using a driving pulse. The imaging optical system 1010 and the focus control mechanism 1012 form a subject image on an image surface of the photoelectric conversion element 1011. The photoelectric conversion element 1011 outputs the address event signal corresponding to the received incident light. More specifically, the address event signal indicating the address of a pixel in which a luminance change has occurred and the time when the luminance change has occurred is output. The evaluation unit 302 acquires the address event signal output from the photoelectric conversion element 1011, counts the number of pixels in which a luminance change has occurred, and transmits a result of comparing the counted number of pixels in which a luminance change has occurred with a predetermined threshold, to the control unit 303. In response to the result output from the evaluation unit 302, the control unit 303 controls the focus control mechanism 1012 to drive the focus lens to the in-focus position. The output unit 304 displays the address and the luminance change direction of a pixel in which a luminance change has occurred, the AF evaluation frame, and the like. The operation acceptance unit 305 accepts setting of the AF evaluation frame, input of an address event threshold to be described below, and the like, based on operations by the user. The output unit 304 and the operation acceptance unit 305 may be implemented by an external device of the imaging apparatus 100.

The functions thereof will be described in detail.

<Evaluation Unit>

Based on the output signal (the address event signal) of the photoelectric conversion element 1011, the evaluation unit 302 calculates a difference between a value obtained by integrating the total number of pixels in which a luminance change has occurred in a specific time range and a predetermined threshold $TH_{AF}$, as an evaluation value, and transmits the calculated evaluation value to the control unit 303. The threshold $TH_{AF}$ is a value of 0 or more, and a preset value or a value set based on other parameters is used as the threshold $TH_{AF}$. The specific time range may be a minimum time width determined by a temporal resolution of the vertical arbitration circuit 121 of the photoelectric conversion element 1011, or a time range longer than the minimum time width may be used for the integration. The narrower the time width is, the more the focusing speed improves, but the wider the time width is, the more the focusing accuracy can improve because the influence of an error caused by random noise or the like can be reduced.

The target region (the AF evaluation frame) for which the evaluation unit 302 counts the total number of pixels in which a luminance change has occurred, based on the address event signal may be the entire angle of view of the imaging apparatus 100, or may be one or a plurality of partial regions in the angle of view, which is set beforehand. Alternatively, the target region may be a range designated by the user via the operation acceptance unit 305. In addition, weighting may be performed within the AF evaluation frame. For example, the counting may be performed by multiplying the number of pixels detected in a peripheral region within the AF evaluation frame by a fixed coefficient (a value between 0 and 1 inclusive). Setting the AF evaluation frame in this way enables the degree of focusing on a subject in the center of the AF evaluation frame to be given high priority as compared with the peripheral region.

<Control Unit>

Figure 4:
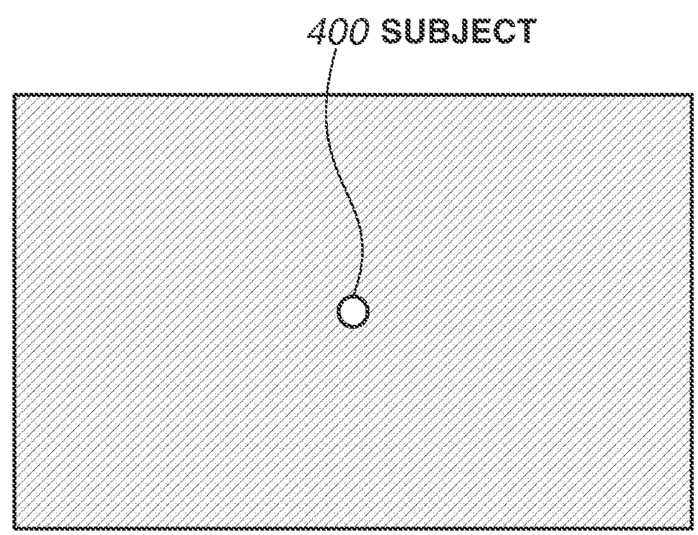
FIG. 4 is a diagram illustrating an example of a subject.
Figure 5:
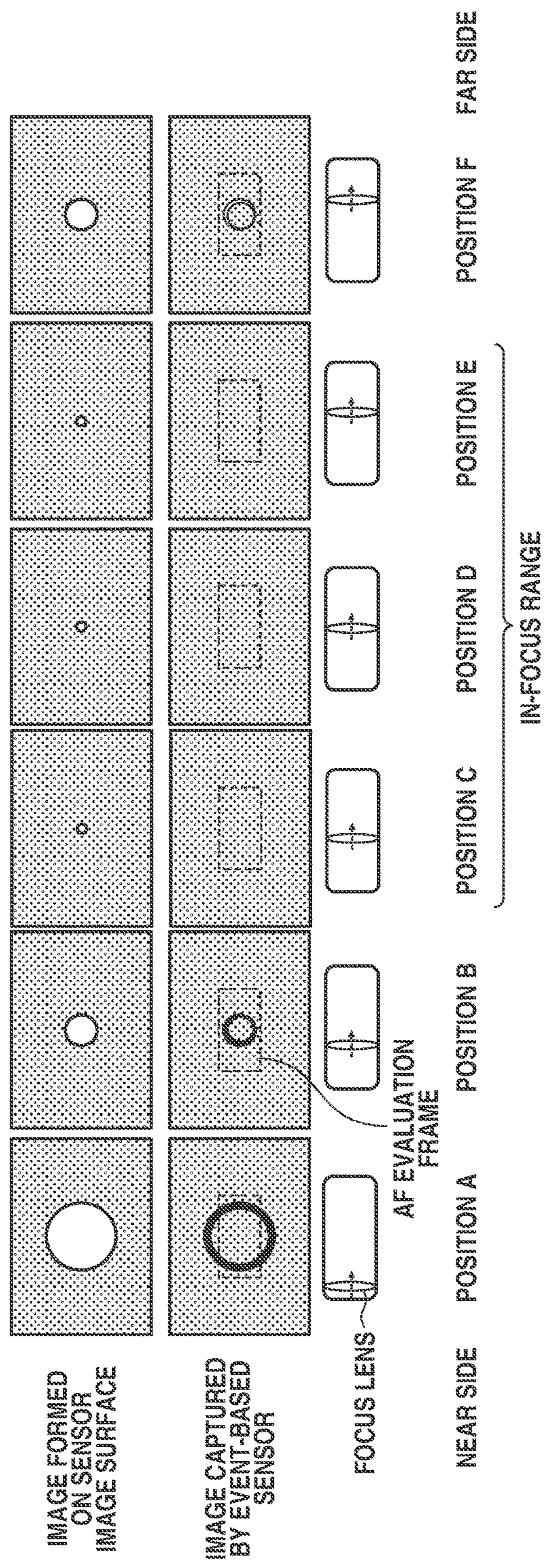
FIG. 5 is a diagram illustrating an example of a focusing method.

The control unit 303 controls the position of the focus lens. More specifically, the control unit 303 keeps driving the focus lens in a fixed direction at a predetermined speed as long as the evaluation value transmitted from the evaluation unit 302 is 0 or more (i.e., the relation of the total number of pixels in which a luminance change has occurred≥the predetermined threshold $TH_{AF}$ is satisfied). This will be described with reference to FIG. 4. FIG. 4 illustrates a subject 400 and a background. In FIG. 4, the subject 400 is a round object and has high luminance as compared with the background. In FIG. 5, an image (incident light) formed on the image surface of the event-based sensor (the photoelectric conversion element 1011) when the subject 400 in FIG. 4 is imaged by the imaging apparatus 100, and an image thereof captured by the event-based sensor are arranged for each position of the focus lens. In the images captured by the event-based sensor, the luminance change in the plus direction is indicated in white, the luminance change in the minus direction is indicated in black, and no luminance change is indicated in gray. A position A on the left side of FIG. 5 corresponds to a near side, and a position F on the right side of FIG. 5 corresponds to a far side. The address event signal includes the direction of the luminance change, and gives a pixel value of +1 in a case where luminance has increased in the pixel, and a pixel value of −1 in a case where luminance has decreased in the pixel. In other words, in the images, the pixel is expressed in white if the pixel value is +1, and is expressed in black if the pixel value is −1.

In this example, a pixel with no luminance change has a pixel value of 0, and is displayed in gray color in the image.

As illustrated in FIG. 5, in a case where the position of the focus lens is away from the in-focus position, like the position A, the subject image is blurred, and the size of the blur decreases as the focus lens travels. A change in the size of the blur is detected as a luminance change by the event-based sensor, so that the number of pixels counted by the evaluation unit 302 becomes the threshold $TH_{AF}$ or more, and the evaluation value becomes a value of 0 or more. When the focus lens is further driven and the subject 400 enters the range of the depth of field (a position C), the blur disappears and the subject image remains unchanged up to a position E. When the focus lens further travels and arrives at the position F, the blur of the subject 400 starts expanding. The change in the subject image decreases between the position C and the position E, and thus the number of luminance changes detected by the event-based sensor also decreases. Accordingly, the total number of pixels counted by the evaluation unit 302 becomes less than the threshold $TH_{AF}$, and the evaluation value becomes a negative value. Thus, the range (from the position C to the position E) in which the focus lens is driven in the period during which the evaluation value is negative can be determined to be a range (hereinafter referred to as an in-focus range) in which the subject 400 is in focus.

The control unit 303 controls the position of the focus lens based on the evaluation value. The control unit 303 counts the time during which the evaluation value takes a negative value. Alternatively, the control unit 303 counts the number of driving pulses applied to the stepping motor of the focus lens during the period in which the evaluation value takes a negative value. In other words, the control unit 303 acquires a moving amount of the focus lens in the period during which the evaluation value is in a predetermined range (is less than the threshold $TH_{AF}$). At the timing when the evaluation value changes to a value of 0 or more again, the control unit 303 stops the focus lens, and drives the focus lens in the reverse direction at the same speed for half the time during which the evaluation value is a negative value. Alternatively, the control unit 303 applies pulses corresponding to half the number of driving pulses applied to the stepping motor of the focus lens during the period in which the evaluation value is a negative value, in the reverse direction.

In other words, the control unit 303 brings the focus lens into the in-focus position by moving the position of the focus lens by a predetermined width when the evaluation value becomes the above-described fixed value or more.

The focus lens thereby arrives at the center (a position D) of the in-focus range, so that the focusing accuracy improves. A focusing method with higher accuracy will be described below.

The initial direction (the near side direction or the far side direction) for moving the focus lens is determined by slightly moving the focus lens in either direction first and then checking a change in the total number of pixels in which a luminance change has occurred. For example, the focus lens may be driven in the reverse direction in a case where the total number of pixels in which a luminance change has occurred increases, and may be driven in the same direction in a case where the total number of pixels in which a luminance change has occurred decreases.

<Output Unit>

The output unit 304 is, more specifically, formed of a liquid crystal display device, a projector, a LED indicator, or the like, and displays the address of a pixel in which a luminance change has occurred and the direction of the luminance change, in response to receiving the output signal of the event-based sensor. The images captured by the event-based sensor, which are illustrated in FIG. 5, are those displayed by the output unit 304. At the coordinates of a pixel in which a luminance change has occurred, white is displayed in a case where the luminance change of the pixel is in the plus direction, black is displayed in a case where the luminance change is in the minus direction, and gray is displayed in a case where there is no luminance change. Furthermore, the convenience of the user may be improved by superimposing the AF evaluation frame or the like on the captured images.

<Operation Acceptance Unit>

The operation acceptance unit 305 is used by the user to control the imaging apparatus 100. More specifically, the operation acceptance unit 305 accepts operations such as issuing an autofocus start instruction, setting the AF evaluation frame, and changing the second threshold and the threshold $TH_{AF}$ described above. The operation acceptance unit 305 is formed of a touch panel, a keyboard, a mouse, a cross key, an operation dial, or the like.

The output unit 304 and the operation acceptance unit 305 described above may be provided in an external apparatus connected to the imaging apparatus 100 by a network cable, wireless transmission, or the like.

<Flowchart>

Figure 6:
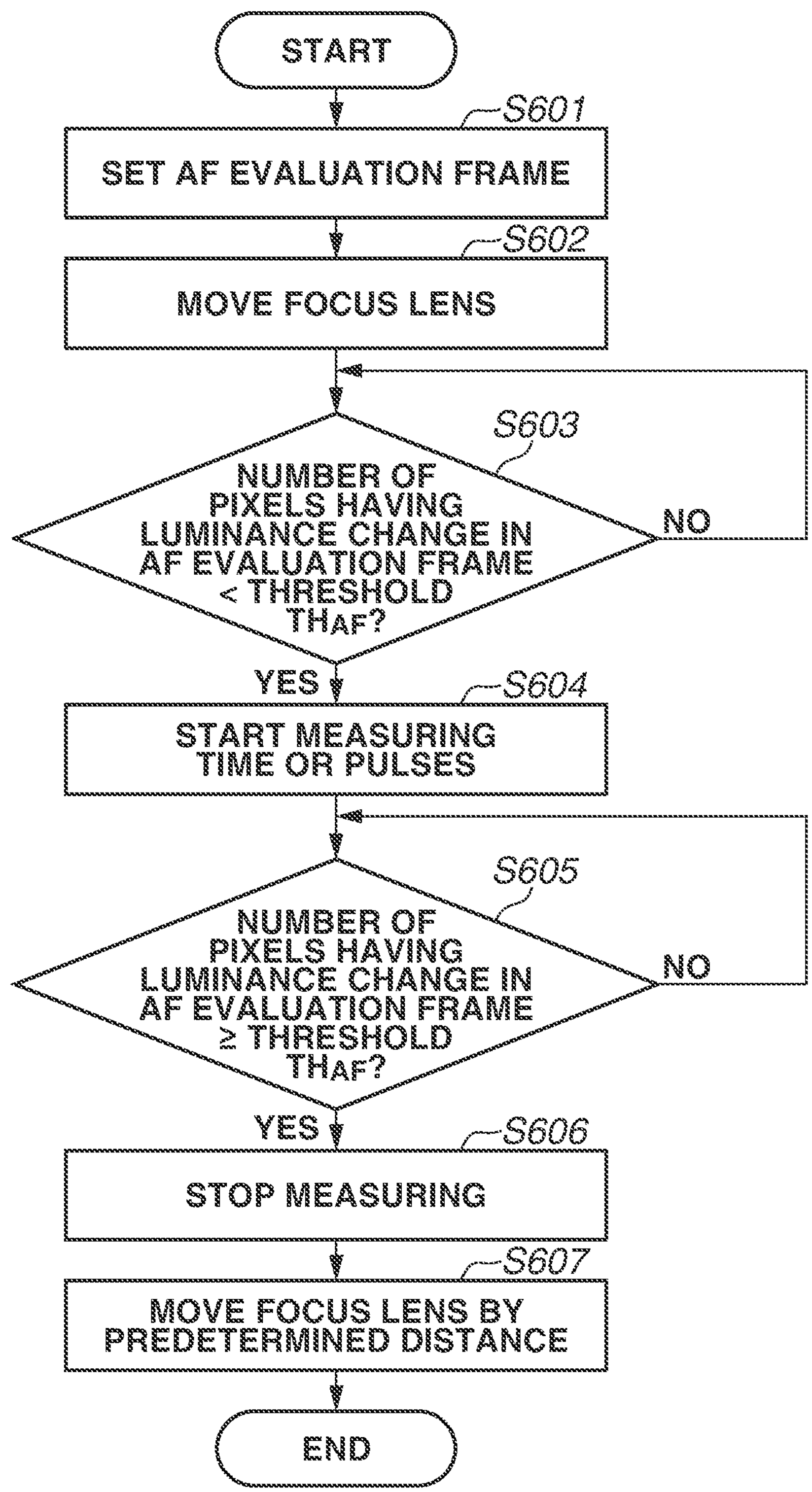
FIG. 6 is a flowchart illustrating processing performed by the imaging apparatus.

Processing for performing the autofocus described above will be described. FIG. 6 is a flowchart illustrating the processing performed by the imaging apparatus 100. The processing in the flowchart in FIG. 6 is performed by the CPU 102 of FIG. 1 serving as a computer, based on a computer program stored in the memory 103. The imaging apparatus 100 may not necessarily perform all steps to be described with reference to the flowchart.

In step S601, the operation unit 105 sets an AF evaluation frame (a position and a size thereof) based on a user's input. In a case where no setting is input by the user, a predetermined AF evaluation frame is set.

In step S602, the control unit 303 controls the position of the focus lens. In this example, using the near side as a starting point, the focus lens is moved to the far side at a constant speed.

In step S603, the evaluation unit 302 counts the number of pixels in which a luminance change has occurred within the AF evaluation frame in a specific time range, based on an address event signal acquired from the imaging unit 301, and transmits the difference between the counted number of pixels and the threshold $TH_{AF}$ to the control unit 303, as the evaluation value. The counting is repeated until the evaluation value becomes a negative value. At the timing when the evaluation value becomes a negative value (YES in step S603), the processing proceeds to step S604.

In step S604, in response to the evaluation value becoming a negative value, the control unit 303 starts measuring the time. Instead of measuring the time, the control unit 303 may start counting the number of driving pulses applied to the stepping motor of the focus lens. In other words, the control unit 303 starts measuring the moving amount of the focus lens.

In step S605, based on the address event signal, the evaluation unit 302 repeats counting the number of pixels as long as the evaluation value is a negative number (NO in step S605), and the processing proceeds to step S606 at the timing when the evaluation value becomes a value of 0 or more (YES in step S605).

In step S606, the control unit 303 stops measuring the time or the number of driving pulses, and calculates the elapsed time from the start of processing in step S604 or the number of driving pulses. In other words, the control unit 303 obtains the moving amount of the focus lens in the period during which the evaluation value is less than the threshold $TH_{AF}$.

In step S607, the control unit 303 moves the focus lens to the in-focus position based on the obtained moving amount of the focus lens. For example, the control unit 303 drives the focus lens in the reverse direction at the same speed as that in step S602, for half the time during which the evaluation value is a negative value, which is calculated in step S606. Alternatively, the control unit 303 moves the focus lens by applying the pulses corresponding to half the number of driving pulses calculated in step S606, in the reverse direction. This makes it possible to bring the subject 400 to the center of the depth of field (i.e., the in-focus range).

<Variation of Lens Driving Method>

Setting a driving speed for the focus lens to be constant makes it easy to calculate and control the in-focus position, whereas setting the driving speed to be variable can increase the focusing speed. For example, the driving speed may be changed based on the number of pixels in which a luminance change has occurred, which is measured by the evaluation unit 302. More specifically, during a period in which the number of pixels in which a luminance change has occurred is large, the distance to the in-focus position can be determined to be long, and thus the driving speed is increased. In a range where the number of pixels in which a luminance change has occurred is close to the threshold $TH_{AF}$, the focusing accuracy is increased by reducing the driving speed. Such control can reduce the total time to be taken for focusing.

<First Variation of In-Focus Position>

The in-focus range described above is a range in which the front depth of field and the rear depth of field are combined, and the rear depth of field is wider. For this reason, a focus plane to achieve the best focus on a subject is present in a range closer to the near side than to the center of the in-focus range.

A hyperfocal distance Y can be calculated from three parameters, namely, a focal length and a f-number of the imaging optical system 1010, and a permissible circle of confusion conceivable from the photoelectric conversion element 1011, a display magnification of the output unit 304, and the like. The hyperfocal distance Y is obtained using the following equation (1), where the focal length is f, the permissible circle of confusion is δ, and the f-number is F.

$$Y=f^2/(\delta\times F) \tag{1}$$

Based on the hyperfocal distance Y and a subject distance estimated as a use case of the imaging apparatus 100, an estimated value of each of the front depth of field and the rear depth of field can be calculated.

Assuming that the front depth of field is A, the rear depth of field is B, and the estimated subject distance is X, the front depth of field A and the rear depth of field B are calculated using the following equations (2) and (3).

$$A=XY/(Y+X) \tag{2}$$

$$B=XY/(Y-X) \tag{3}$$

Because the true focus plane is located forward from the edge on the near side of the in-focus range by a distance corresponding to the front depth of field, the following is performed to bring the best focus plane to the subject.

At the timing when the evaluation value becomes a value of 0 or more again after becoming a negative value once with the movement of the focus lens, the focus lens is stopped. In a case where the focus lens is moved in the direction from the near side to the far side before being stopped, the focus lens is driven in the reverse direction from the position where the focus lens is stopped, by a distance corresponding the rear depth of field.

In a case where the focus lens is moved in the direction from the far side to the near side before being stopped, the focus lens is driven in the reverse direction by the distance corresponding to the front depth of field. A further description will be provided using the case where the focus lens is driven from the far side to the near side as an example. First, a ratio between the front depth of field and the rear depth of field (hereinafter referred to as a front to rear depth ratio) derived based on the equations (2) and (3) is calculated. Next, a time ΔT during which the evaluation value is negative while the focus lens is driven is distributed at the front to rear depth ratio. For example, if the front to rear depth ratio is 2:3 (front: rear), ⅖ of the time ΔT during which the evaluation value is negative is the time corresponding to the front depth of field. This time represents the time taken before the focus plane is moved by the focus lens being driven at a constant speed, by the same distance as the distance corresponding to the front depth of field. Thus, when the focus lens is driven in the reverse direction for the same time as this time at the same speed, the subject is brought to the best focus plane. Alternatively, when the number of driving pulses applied to the stepping motor of the focus lens in the period during which the evaluation value is negative while the focus lens is driven is distributed at the front to rear depth ratio, and the pulses corresponding to the number corresponding to the front depth of field are applied in the reverse direction, the same result can be obtained. With this method, the calculation amount increases, but autofocus with higher accuracy can be achieved.

<Second Variation of In-Focus Position>

Yet another method will be described. This method reduces the time for focusing without moving the focus lens from the edge on the near side of the in-focus range to the edge on the far side thereof. The method will be described on the assumption that the focus lens is driven in the direction from the near side to the far side.

Starting from the point in time when the evaluation value has changed from a value of 0 or more to a negative value with the movement of the focus lens, the focus lens is driven to move the focus plane by the distance corresponding to the front depth of field, so that focus is achieved. The driving distance of the focus lens at this time is calculated from the front depth of field calculated using the equation (2), and a moving amount (hereinafter referred to as sensitivity) of the focus plane relative to the moving amount (the number of driving pulses) of the focus lens. When the front depth of field is divided by the sensitivity, the distance by which the focus lens is to be driven, i.e., the number of driving pulses, is determined. The sensitivity is a value unique to the imaging optical system 1010 in use, and the value is to be obtained in advance by performing measurement or the like.

In this method, although the sensitivity is to be obtained in advance, driving the focus lens to the opposite edge after the focus lens arrives at either edge of the in-focus range is not to be performed, and thus the time for focusing can be reduced.

<Variation of Evaluation Value>

A calculation method for the evaluation value less likely to be affected by random noise will be described. The method using the difference between the total number of pixels in which a luminance change has occurred in a specific time range and the threshold $TH_{AF}$ as the evaluation value has been described above. Although the calculation amount for the evaluation value is small in this method, the number of pixels in which a luminance change has occurred is integrated regardless of the direction of the luminance change, and thus a luminance change caused by random noise is also included in the count. As a method for reducing false counts caused by random noise, a method in which the time before a luminance change in the reverse direction occurs in each pixel within the AF evaluation frame is used as the evaluation value will be described next. The time before the luminance change in the reverse direction occurs is each of a time difference between occurrence of a positive luminance change and occurrence of a negative luminance change after the positive luminance change, and a time difference between occurrence of a negative luminance change and occurrence of a positive luminance change after the negative luminance change. The time difference can be calculated by taking a difference between pieces of time information (timestamps) included in address events. An average value of the time differences in the AF evaluation frame is calculated, and if the average value is less than a threshold $TH_T$, the luminance change is determined to be caused by random noise and the evaluation value is determined to be 0, and if the average value is the threshold $TH_T$ or more, the time difference is determined as the evaluation value.

As seen in the images captured by the event-based sensor in FIG. 5, in a case where a blur of a bright subject shrinks as the focus lens moves, like the position A and a position B, a dark background appears in the contour portion of the blur and is thus detected as a negative luminance change. On the other hand, in a case where the blur expands as the focus lens moves, like the position F, a positive luminance change is detected in the contour portion of the blur. The subject image does not change in the in-focus range from the position C to the position E, and thus no luminance change is detected. When looking at the same pixels in the contour portion of the blur in each of the images on both sides (the positions B and F) of the in-focus range, the color changes from black to gray and then to white. In other words, the time difference between occurrence of the black color (the negative luminance change) and occurrence of the white color (the positive luminance change) corresponds to the in-focus range.

Figure 7:
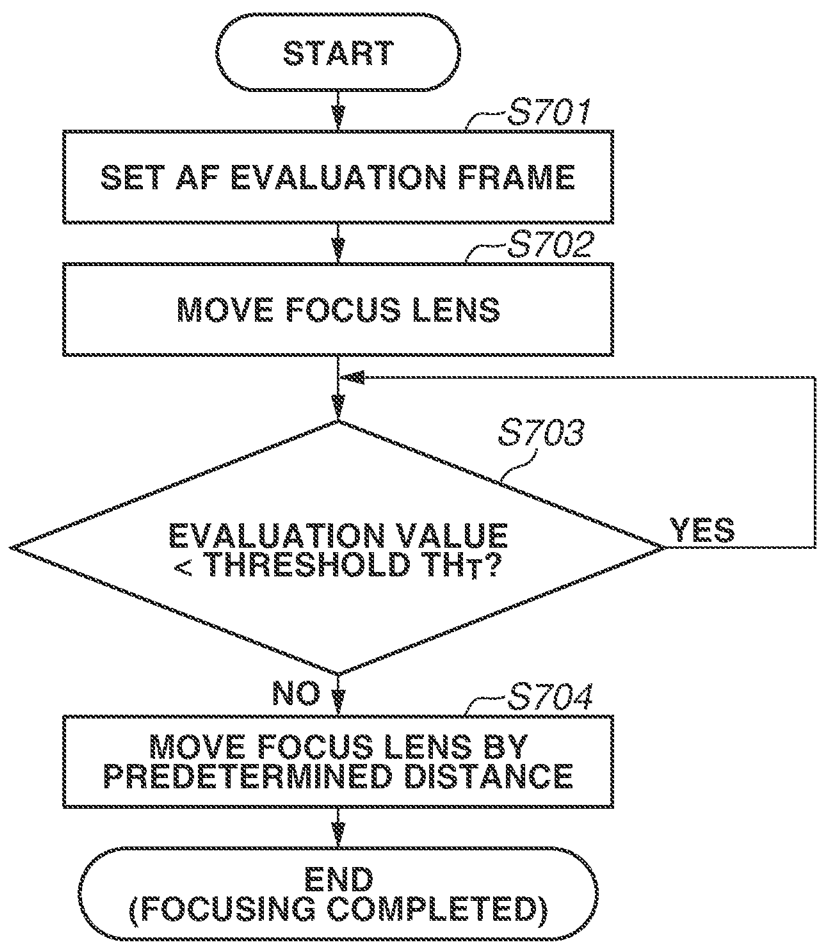
FIG. 7 is a flowchart illustrating another processing performed by the imaging apparatus.

A procedure for performing autofocus using the time difference as the evaluation value will be described with reference to a flowchart in FIG. 7. Step S701 and step S702 are similar to step S601 and step S602, respectively, in the flowchart in FIG. 4. In step S703, the evaluation unit 302 determines whether the evaluation value is 0. As described above, the luminance change in the reverse direction occurs immediately before the focus lens enters the in-focus range and immediately after the focus lens leaves the in-focus range, and thus, the time difference between the luminance changes is the evaluation value.

In other words, at a point in time when the evaluation value has taken a value other than 0 in step S703, the lens is located at the opposite edge of the in-focus range. The evaluation value is compared with the threshold $TH_T$, and if the evaluation value is less than the threshold $TH_T$ (YES in step S703), step S703 is repeated, and if the evaluation value is the threshold $TH_T$ or more (NO in step S703), the focus lens is stopped and the processing proceeds to step S704.

In step S704, the control unit 303 moves the focus lens in the reverse direction at the same speed for a time corresponding to half the evaluation value. Since the evaluation value is the time taken for the focus lens to pass through the in-focus range, when the focus lens is driven in the reverse direction for the time corresponding to half the evaluation value, the subject can be placed in the center of the in-focus range. The in-focus position may be adjusted by considering the front depth of field or the rear depth of field in order to bring the best focus plane to the subject, similarly to the above-described method.

In a case where the evaluation value is obtained by simply counting the total number of pixels in which a luminance change has occurred within the AF evaluation frame, it is difficult to distinguish between a luminance change caused by random noise and a luminance change of the subject, and thus it is difficult to count these luminance changes separately. However, the present method can eliminate the luminance change in the same direction caused by random noise, and thus false counts caused by random noise can be reduced.

As described above, using the method according to the present exemplary embodiment enables autofocus in the imaging apparatus using the event-based sensor, so that the convenience of the user can be improved. The control method according to the present exemplary embodiment is effective, in particular, in a case where the focus is to be set quickly.

<Use of Optical Flow>

A second exemplary embodiment of the disclosure is different from the first exemplary embodiment in that an optical flow is generated in the evaluation unit 302 that has received an output of the photoelectric conversion element 1011. As a method for generating the optical flow, a known gradient method or a known block matching method may be used. This makes it possible to reduce an influence other than an influence of a subject, and perform autofocus more resistant to disturbance. A hardware configuration and a functional configuration of the imaging apparatus 100 are similar to those in FIGS. 1 and 3 according to the first exemplary embodiment.

Figure 8:
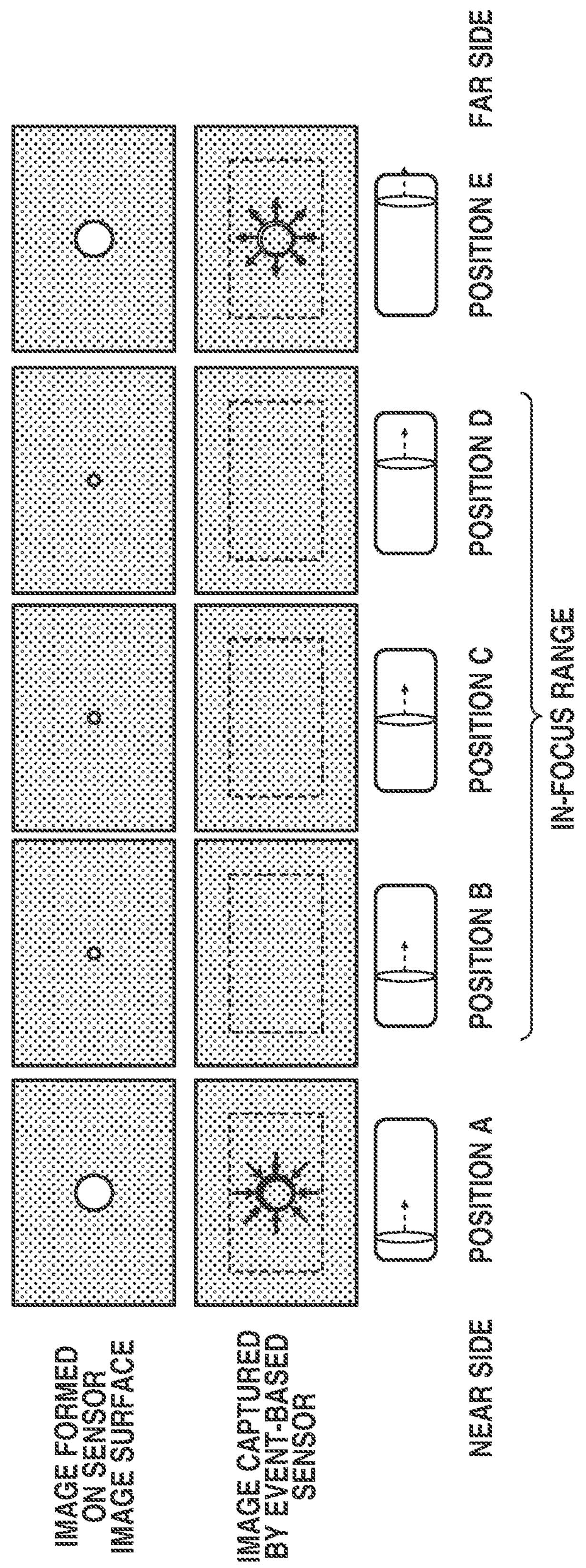
FIG. 8 is a diagram illustrating another example of the focusing method.

FIG. 8 illustrates images formed on the sensor image surface, and images obtained by capturing the formed image using the event-based sensor, for each focus lens position. A subject is the same as that in FIG. 5. As seen in the images captured by the event-based sensor in FIG. 8, an optical flow indicating shrinkage of a blur is generated along the contour of the blur of the subject image in the image (at the position A) immediately before entering the in-focus range. Furthermore, an optical flow indicating expansion of the blur is generated along the contour of the blur of the subject image in the image (at the position E) immediately after passing through the in-focus range after disappearance of the optical flow in the in-focus range. In other words, the focus lens can be controlled to be in the in-focus range, by using the time after the optical flow disappears and before the reversal occurs. More specifically, the following is performed.

First, the evaluation unit 302 finds a vector group indicating shrinkage of an object in the generated optical flow. At the timing when the vector group indicating the shrinkage disappears after the focus lens travels and enters the in-focus range, counting of the time or counting of the number of driving pulses applied to the focus lens begins. When a vector group indicating expansion of the object occurs after the focus lens further travels and leaves the in-focus range, the counting of the time or the number of driving pulses is stopped and the focus lens is also stopped. Afterward, the focus lens is driven in the reverse direction at the same speed for half the time measured by the evaluation unit 302. Alternatively, the pulses corresponding to half the counted number of driving pulses are applied to the stepping motor in the reverse direction. This makes it possible to place the subject at the center of the in-focus range.

Figure 9:
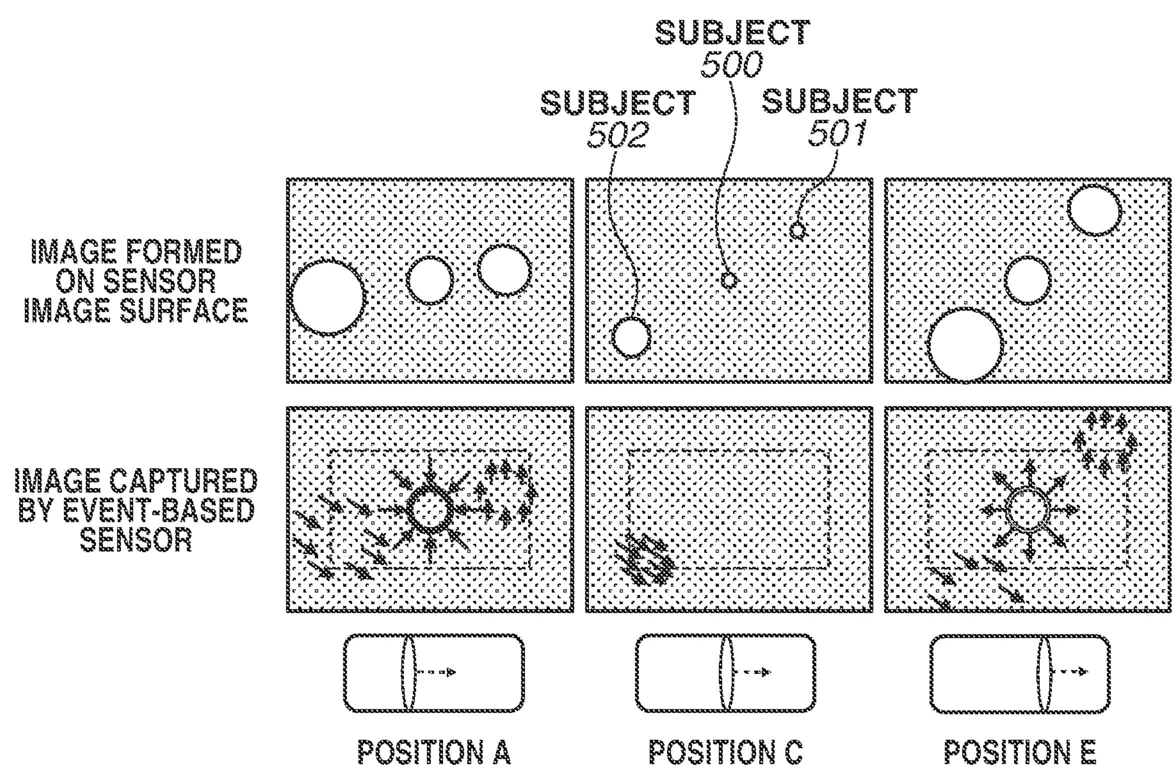
FIG. 9 is a diagram illustrating yet another example of the focusing method.

A benefit of the present exemplary embodiment will be described with reference to FIG. 9. FIG. 9 illustrates images in a case where some obstructive subjects are moving, or in a case where a moving object is in the background, in addition to a subject to be brought into focus.

In FIG. 9, a subject 500 in an image formed on the sensor image surface is the subject to be brought to into focus, and subjects 501 and 502 are moving subjects not to be brought into focus. In particular, the subject 502 is different from the subjects 500 and 501 in distance from the imaging apparatus 100. For this reason, the optical flow of each of the subjects 500 and 501 disappears when entering the in-focus range because of no change in subject blur, whereas the subject 502 different in distance from the subjects 500 and 501 has the subject blur that remains at this focus position and thus the optical flow also remains without disappearing.

The evaluation unit 302 uses an optical flow indicating the shrinkage or expansion of the contour of an object, for making a determination about focusing, and ignores an optical flow indicating the movement of the contour of an object in one direction, like the optical flow of each of the subjects 501 and 502 in FIG. 9. This makes it possible to reduce influence of a subject corresponding to a disturbance component. When the focus lens is controlled using the optical flow indicating the shrinkage or expansion in a manner similar to the above-described method, the subject can be placed at the center of the in-focus range.

<First Variation of Graphical User Interface (GUI)>

In the event-based sensor, the subject image disappears when the focus lens enters the in-focus range, and thus there is a possibility that a user accustomed to an ordinary imaging apparatus may have difficulty in intuitively grasping whether focus is achieved and thus may be confused. In particular, also in a case where there are many still subjects, subject images disappear when the focus lens is stopped after the autofocus operation ends, and thus it is difficult to determine whether focus is achieved.

Figure 10:
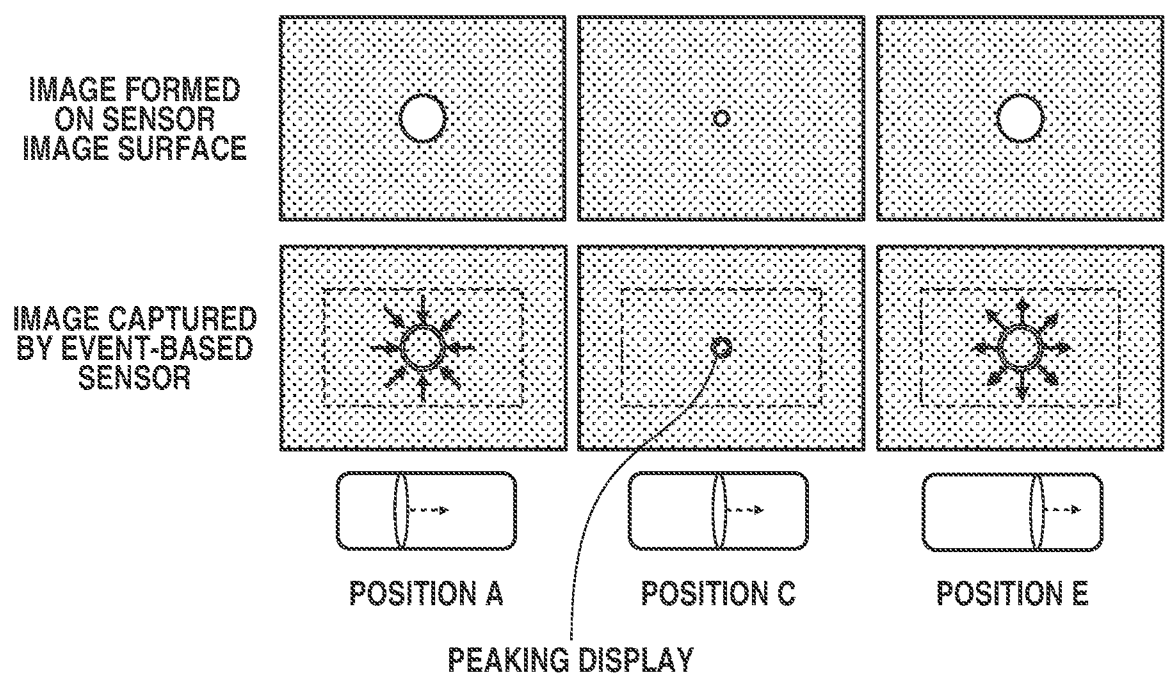
FIG. 10 is a diagram illustrating yet another example of the focusing method.

FIG. 10 illustrates an example of display by the display unit 104 during autofocus control. A subject image is supposed to disappear in a period corresponding to the position C in the in-focus range, but, in this example, peaking display of the contour of the subject is performed to make it easy to recognize the subject being in focus. The peaking display can be performed in such a manner that the contour (the luminance change) of the subject is traced in the period corresponding to the position A and the peaking display is continued at the position where the luminance change has disappeared (the focus lens has entered the in-focus range) in a case where the disappearance occurs. The peaking display may be performed in the period corresponding to the position C, or may be constantly performed from the position A to the position E. The former is desirable in that the user can recognize that the subject is out of focus in a case where the peaking display is cancelled, and the latter is desirable in that a change in blur of the subject image can be easily recognized and thus it is easy for the user to recognize progress before focus is achieved.

<Second Variation of GUI>

Figure 11:
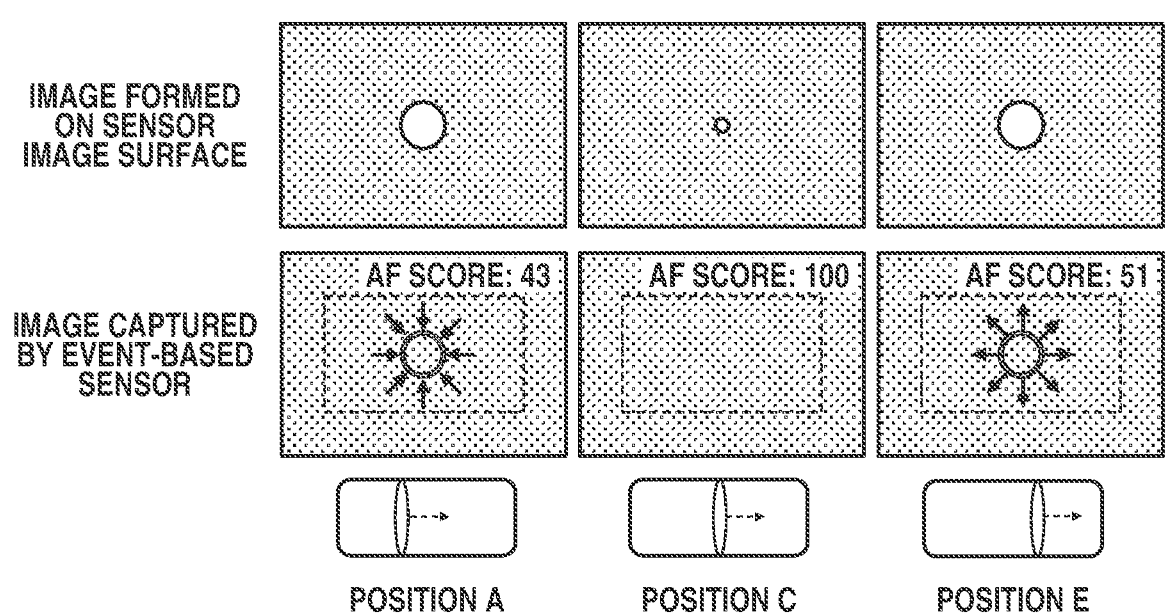
FIG. 11 is a diagram illustrating yet another example of the focus method.

FIG. 11 illustrates an example of display by the output unit 304, which makes it easy for the user to recognize an autofocus result. Images captured by the event-based sensor in FIG. 11 are those displayed by the output unit 304, and a score (hereinafter referred to as an AF score) indicating the degree of focusing in numerical values of 1 to 100 is superimposed and displayed in the screen. The AF score may be the evaluation value calculated by the evaluation unit 302, or may be calculated using any type of calculation method as long as the best focus position corresponds to the peak of the score and the score has a value that is smaller as the distance from the best focus position is longer. For example, the AF score may be emphasized and displayed in a case where the AF score exceeds a fixed value (e.g., 80). On the contrary, the AF score may be displayed in a case where the AF score is less than a fixed value (e.g., 40) and the user may be prompted to perform an operation for achieving focus. Such superimposition display makes it easy for the user to understand the result of focusing. However, the evaluation value to be displayed is calculated after the in-focus range is measured once, and thus, first, any of the above-described focusing methods is performed once and the second focusing operation is subsequently performed, and the evaluation value is superimposed and displayed during this period. Thus, actually, the time for performing the focusing twice is consumed, and thus the focusing speed decreases, but it is easy for the user to recognize the degree of focusing because the AF score is superimposed and displayed.

<Focusing on Plurality of Subjects>

Figure 12:
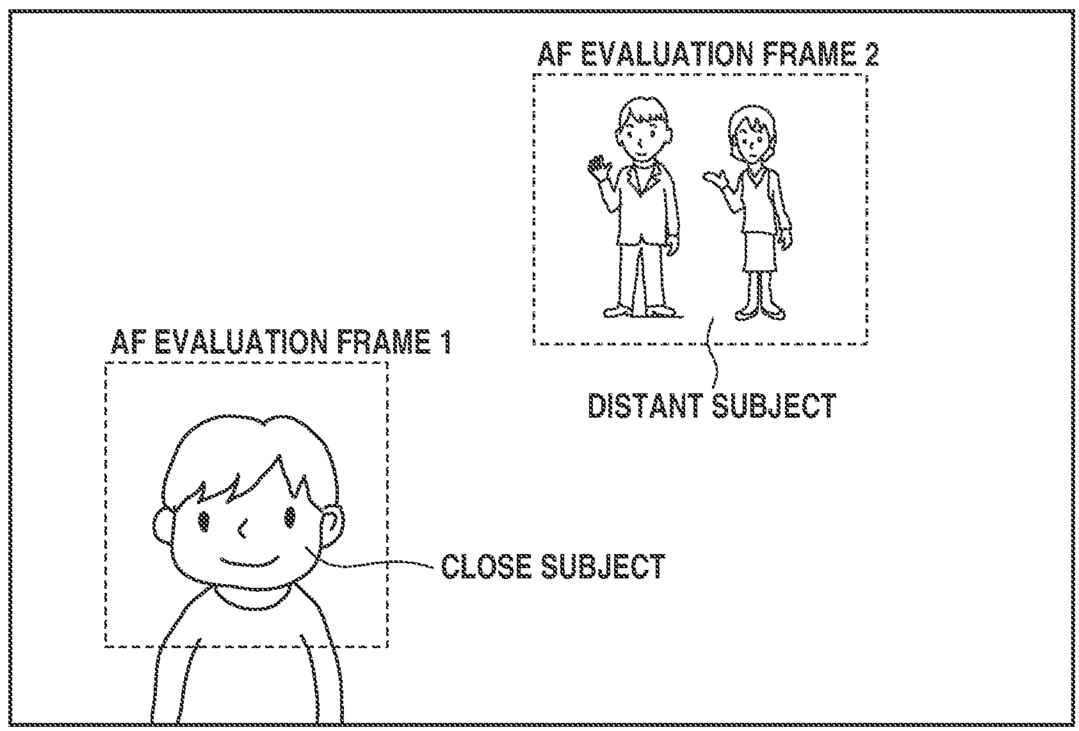
FIG. 12 is a diagram illustrating an example of display.

A case where there is a plurality of subjects to be brought into focus will be described with reference to FIG. 12. In FIG. 12, a plurality of AF evaluation frames is set. In an AF evaluation frame 1, a subject is at a position close to the imaging apparatus 100. In an AF evaluation frame 2, distant subjects are present. In this example, the imaging optical system 1010 of the imaging apparatus 100 is assumed to include an aperture control unit for changing the aperture.

In such a case, at first, the in-focus range of each of the AF evaluation frames 1 and 2 is searched for, using any of the above-described focusing methods. In a case where there is an overlap between the in-focus ranges of the AF evaluation frames 1 and 2, the position of the focus lens is set at the center of the overlapping in-focus ranges. This makes it possible to bring all the subjects into focus. In a case where there is no overlap between the in-focus ranges of the AF evaluation frames 1 and 2, a f-number that allows an overlap between the in-focus ranges of the AF evaluation frames 1 and 2 is calculated using the equations (1) to (3), and the current f-number is changed to the calculated f-number. Subsequently, the focus lens is moved to the center of the overlapping in-focus ranges. Such control makes it possible to also bring a plurality of subjects varying in distance into focus as appropriate.

As described above, the method according to the present exemplary embodiment enables autofocus in the imaging apparatus using the event-based sensor, thereby improving the convenience of the user.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-097303, filed Jun. 10, 2021, which is hereby incorporated by reference herein in its entirety.

What is claimed is:

1. An apparatus comprising:

at least one memory storing instructions; and at least one processor that, upon execution of the stored instructions cause the at least one processor to:

control a position of a focus lens of the apparatus;

acquire an event signal indicating a position of a pixel in which a luminance change has occurred and a time when the luminance change has occurred; and determine an in-focus position of the focus lens by acquiring, for each position of the focus lens, an evaluation value based on the event signal, wherein, as the in-focus position, a position to which the focus lens is moved by a predetermined width from a position where the focus lens is located when the evaluation value has become a predetermined reference value or more is determined, wherein a first time during which the evaluation value is less than the predetermined reference value is counted, and when the evaluation value has become the predetermined reference value or more, the position of the focus lens is controlled so that the focus lens is returned by the predetermined width based on a moving amount of the focus lens moved during the first time.

2. The apparatus according to claim 1, wherein the evaluation value is a difference between a value obtained by integrating a total number of pixels in which a luminance change has occurred in a specific time range and a predetermined threshold, wherein the difference is calculated based on the event signal.

3. The apparatus according to claim 1, wherein the event signal includes a direction of a luminance change, wherein, based on the event signal, a positive pixel value in a case where the direction of the luminance change is a plus direction, a negative pixel value in a case where the direction of the luminance change is a minus direction, and a pixel value of 0 in a case where there is no luminance change are acquired, as a pixel value of each pixel in an image captured by the apparatus, and wherein the determination unit determines the in-focus position of the focus lens is determined based on the pixel value of each pixel in the image and the predetermined reference value.

4. The apparatus according to claim 3, wherein the in-focus position of the focus lens is determined based on a number of pixels each having the positive or negative pixel value in the image and the predetermined reference value.

5. The apparatus according to claim 3, wherein the in-focus position of the focus lens is determined based on a position where the focus lens is located when the pixel value of a pixel of interest in the image has changed from the positive pixel value to the negative pixel value or from the negative pixel value to the positive pixel value.

6. The apparatus according to claim 1, wherein a speed for moving the focus lens is changed, based on a difference between the evaluation value and the predetermined reference value.

7. The apparatus according to claim 1, wherein the control is performed to control to move the focus lens from a predetermined starting point at a constant speed.

8. The apparatus according to claim 1, wherein an in-focus range including the in-focus position is further determined, based on a depth of field of the apparatus.

9. The apparatus according to claim 1, wherein the in-focus position is determined based on an optical flow generated based on the event signal.

10. The apparatus according to claim 1, wherein the evaluation value is determined based on the event signal in a partial region included in an angle of view of the apparatus.

11. The apparatus according to claim 10, wherein the evaluation value is determined in each of a plurality of partial regions included in the angle of view of the apparatus.

12. The apparatus according to claim 11, wherein a diaphragm aperture diameter of the apparatus is further controlled, and wherein, for each of at least one or more partial regions in the angle of view of the apparatus, the diaphragm aperture diameter and the position of the focus lens are determined based on the evaluation value, so that the at least one or more partial regions are simultaneously in focus.

13. The apparatus according to claim 1, the stored instructions further cause the at least one processor to display, based on the event signal, an image indicating the position of the pixel in which the luminance change has occurred, and the evaluation value.

14. The apparatus according to claim 1, wherein the event signal is output by a conversion element including a pixel that outputs a signal based on incidence of photons.

15. The apparatus according to claim 1, wherein the evaluation value is a time difference between occurrence of a positive luminance change and occurrence of a negative luminance change after the positive luminance change, or a time difference between occurrence of a negative luminance change and occurrence of a positive luminance change after the negative luminance change, wherein the time difference is calculated based on the event signal.

16. A non-transitory computer-readable storage medium storing a program for causing a computer to execute a method for controlling an apparatus, the method comprising:

controlling a position of a focus lens of the apparatus;

acquiring an event signal indicating a position of a pixel in which a luminance change has occurred and a time when the luminance change has occurred; and determining an in-focus position of the focus lens by acquiring, for each position of the focus lens, an evaluation value based on the event signal, wherein, as the in-focus position, a position to which the focus lens is moved by a predetermined width from a position where the focus lens is located when the evaluation value has become a predetermined reference value or more is determined, wherein a first time during which the evaluation value is less than the predetermined reference value is counted, and when the evaluation value has become the predetermined reference value or more, the position of the focus lens is controlled so that the focus lens is returned by the predetermined width based on a moving amount of the focus lens moved during the first time.

17. A method for controlling an apparatus, the method comprising:

controlling a position of a focus lens of the apparatus;

acquiring an event signal indicating a position of a pixel in which a luminance change has occurred and a time when the luminance change has occurred; and determining an in-focus position of the focus lens by acquiring, for each position of the focus lens, an evaluation value based on the event signal, wherein, as the in-focus position, a position to which the focus lens is moved by a predetermined width from a position where the focus lens is located when the evaluation value has become a predetermined reference value or more is determined, wherein a first time during which the evaluation value is less than the predetermined reference value is counted, and when the evaluation value has become the predetermined reference value or more, the position of the focus lens is controlled so that the focus lens is returned by the predetermined width based on a moving amount of the focus lens moved during the first time.

* * * * *